(12) United States Patent
Kling et al.

(10) Patent No.: US 7,761,354 B2
(45) Date of Patent: Jul. 20, 2010

(54) BANKING SOFTWARE DESIGN GENERATOR

(75) Inventors: Oliver Kling, Bruchsal (DE); Jens-Peter Jensen, Ludwigshafen (DE); Reiner Wallmeier, Wiesloch (DE); Martin Schroter, Bad Schönborn (DE)

(73) Assignee: SAP AG, Walldorf (DE)

( * ) Notice: Subject to any disclaimer, the term of this patent is extended or adjusted under 35 U.S.C. 154(b) by 207 days.

(21) Appl. No.: 11/453,160

(22) Filed: Jun. 13, 2006

(65) Prior Publication Data

US 2007/0288276 A1    Dec. 13, 2007

(51) Int. Cl.
*G06Q 40/00* (2006.01)
(52) U.S. Cl. .................... 705/35; 717/104; 717/111
(58) Field of Classification Search .............. 705/35; 717/104, 111
See application file for complete search history.

(56) References Cited

U.S. PATENT DOCUMENTS

| | | | |
|---|---|---|---|
| 6,535,855 B1 * | 3/2003 | Cahill et al. | 705/1 |
| 6,904,449 B1 * | 6/2005 | Quinones | 709/203 |
| 2003/0084120 A1 * | 5/2003 | Egli | 709/218 |
| 2004/0093307 A2 * | 5/2004 | Paglin | 705/42 |
| 2004/0103393 A1 * | 5/2004 | Reddy et al. | 717/122 |

* cited by examiner

*Primary Examiner*—James P Trammell
*Assistant Examiner*—John A Anderson
(74) *Attorney, Agent, or Firm*—Kenyon & Kenyon LLP (57) ABSTRACT

Banking software application development includes defining a plurality of banking object terms, each of these terms relating to components of a banking relationship. Additionally, the software is developed by defining a plurality of responsibility area terms, each of these terms relating to banking activities, wherein each of the responsibility area terms includes at least one of the banking object terms. From the defined relationships, the software is developed by generating a solution foundation for at least one of the responsibility area terms by defining relationships between the plurality of business object terms. Therefore, the banking software application is developed based on the solution foundation.

16 Claims, 7 Drawing Sheets

BANKING SOFTWARE DESIGN GENERATOR

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to processing and data routine developments for a software application and more specifically to modeling and defining functional relationships in designing and developing banking related software applications.

Software applications can be developed in many different techniques. One such technique is to use a modeling technique to define the underlying guidelines. Modeling techniques provide for the initial definition of various components of the problems to be solved. From these definitions, interrelations between the components define a framework. These guidelines then, through the framework, provide for the software encoding, where the encoded software attempts to embody the modeled features. This general technique allows for the development of various types of software applications based on the underlying modeling operations.

One such area for software development relates to banking software applications. The banking applications include features directed to one or more of the various aspects of the banking business, such as but not limited to front end user interfacing, mid-level processing applications, back end financial transactions, among others. In existing techniques for the development of software applications relating to banking, modeling techniques have a very fine level of granularity. As the banking application includes numerous levels of applications, the application and underlying modeling technique provides for various levels of solutions to specific components or elements of the banking transactions.

For example, one area of a banking software application may include transactions relating to customer interface with an online or Internet-based banking access portal. The existing modeling techniques provide strategic and specific guidelines for solutions relating to this business activity. In some modeling techniques, the model may include specifically related aspects, such as back-end interface between the portal itself and the resident banking system. But, the modeling technique is very limited to this specific activity and therefore does not and cannot address concerns beyond the matter at hand, such as issues that might arise with a transaction closing portion of the banking application, for example.

The existing modeling technique is a very static solution offering limited flexibility. Another shortcoming of the existing modeling technique is the requirement of the model to be a time specific view of the banking application. Consistent with the static shortcoming of existing techniques, the modeling application requires the predefinition of a specific scenario and thus models a framework from that scenario. Based on the fine granularity level of the model, all extraneous components of the application need to be statically defined. This "snap in time" model requires developers to define how an application or banking scenario would look and then define the model around this definition. This static technique provides a short-sighted solution to an individually defined component but fails to provide a framework model for the full banking software application.

Additionally, this technique requires multiple modeling operations to each individual component to create the full framework. This technique can be very cumbersome and prone to errors. As each component is individually modeled, this requires not only a large amount of individual computation, but a large degree of static definitions for modeling terms and significant amounts of integration to generate a final framework. Additionally, any minor adjustments to the multiple models can have a significant negative effect on other related and un-related models as this may change predefined terms of these other modeling operations. Therefore, the existing technique is difficult to use to develop a full banking software application and does not lend itself to a dynamic modeling approach based on the fine level granularity used to model individual components.

DETAILED DESCRIPTION

Through the use of a modeling approach, a directed banking software application may be developed. By addressing specific issues directed to various levels of operational aspects of the intended usage of the banking application, the framework defines customized development for the software to provide desired solution.

Figure 1:
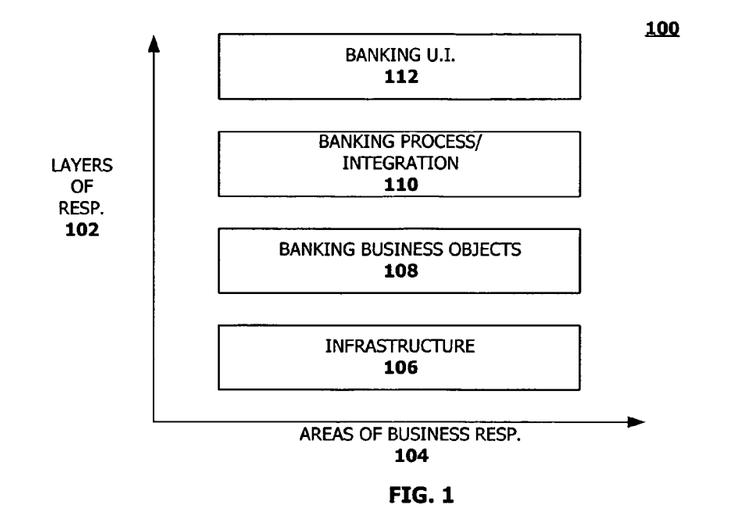
FIG. 1 illustrates a chart of the dimensions of responsibilities applicable to banking software applications.

FIG. 1 illustrates graphical representation 100 of a chart of layers of responsibility 102 relative to areas of responsibility 104. In banking application development, a target solution addresses the requirements from user's perspective including areas affecting system flexibility. The requirements include the areas of business responsibility 104 and the layers of responsibility 102 in the operating environment of the banking application.

These responsibility components can lead to different solution life cycles depending on the size and complexity of the specific customer situation. Many banks, as the primary user of the banking software application, structure processing landscapes in a level of coarse granularity, also referred to domains. These domains implement end to end processes with costly levels of redundancy. Banks need a higher granularity and lower redundancy within their processing landscape to achieve the required flexibility. Lowest redundancy is provided if there is approximately one owner per business task. Highest flexibility is achieved if granularity is on a business object level. Additionally, the banking software application is directed to various segments of the banking industry including, among others, retail banking, wholesale banking, private banking, investment banking and wealth management.

As illustrated in the chart of FIG. 1, there are four layers of responsibility 102. The layers includes an infrastructure layer 106, a banking business object layer 108, a banking processing/integration layer 110 and a banking user interface layer 112. The infrastructure layer 106 may be the lowest level of responsibility layer, including the levels of the user's processing equipment. The banking business objects layer 108 is discussed in further detail below. The banking process/integration layer 110 is directed to the ability for the user to integrate the application or solution to an existing system. The banking user interface layer 112 is directed to the front end system allowing users' customers and personnel to access the system, such as bank tellers or office workers.

The responsibility areas provides direction as to how the various services are constructed from a banking software perspective. The solutions then support the value drivers in the associated areas of responsibility through the banking software application. Different value drivers result in different architectural guiding principles per area of responsibility.

Figure 2:
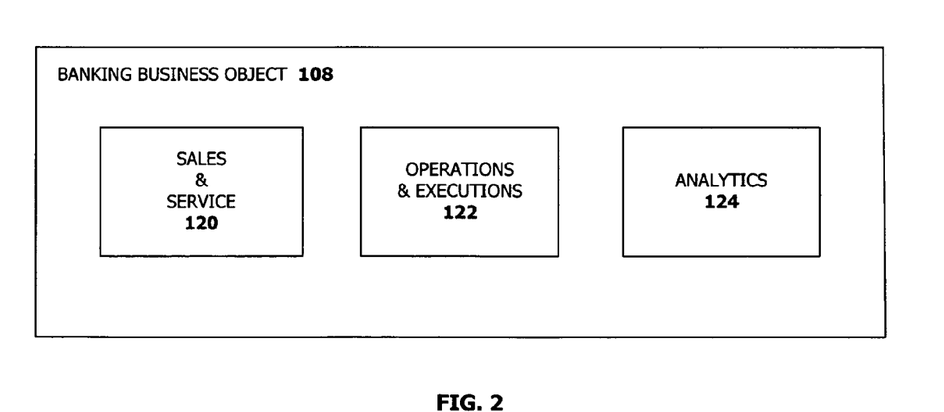
FIG. 2 illustrates a block diagram of a banking business object.

Within each of the layers 102 of FIG. 1, there includes individual areas of responsibility 104. As business object granularity may provide a bank wide understanding of operating tasks, FIG. 2 illustrates the separation of the tasks within the areas of responsibility of the business banking object 108. These areas include sales and service 120, operations and executions 122 and analytics 124.

Figure 3:
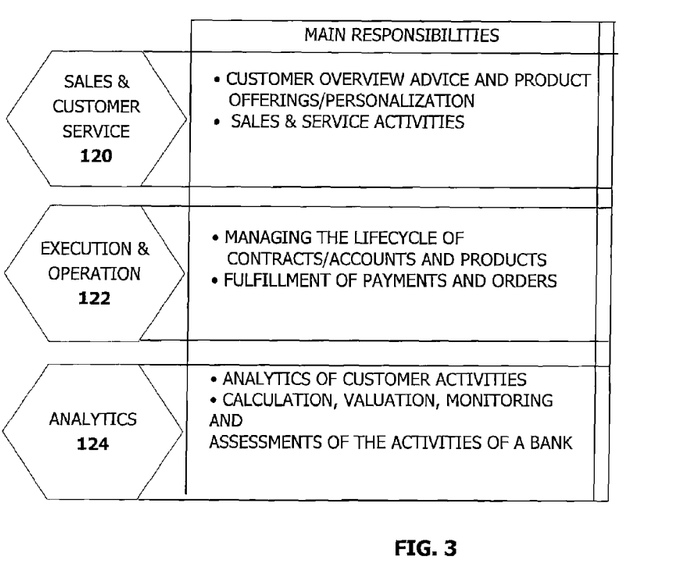
FIG. 3 illustrates a graphical representation of a separation of concerns regarding areas of business responsibility.

The business objects 108 represent different responsibility areas for users utilizing the banking software and thereby different solution responsibilities for the software itself. FIG. 3 illustrates a table of the areas of responsibilities of the banking business objects 108.

The sales and customer service area 120 includes the front end processing components and aspects related to customer sales and service concerns. The main responsibilities include, but are not limited to, customer overview advice and product offering and/or personalization and sales and service activities.

The operations and executions area 122 includes the processing operations of the banking system and the execution of operations across the various banking levels, such as a between front end data entry to the back end account processing operations. The main responsibilities include, but are not limited to, managing the lifecycle of the contractions/accounts and products and fulfillment of payments and orders.

The analytics area 124 includes the processing of operation data and analyzes of system operations to determine various levels of system efficiency. The main responsibilities include, but are not limited to, analytical processing of customer activities and the calculation, valuation, monitoring and assessment of the bank activities.

Figure 4:
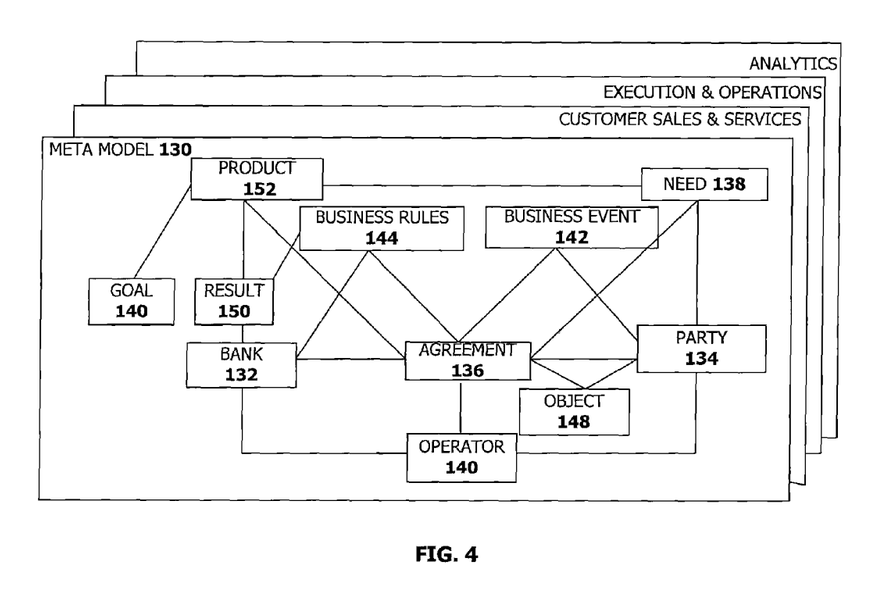
FIG. 4 illustrates a graphical representation of one embodiment of a meta model of the areas of responsibility.

FIG. 4 illustrates a graphical representation of a meta model of the areas of responsibilities. As visible in FIG. 4, the meta model 130 represents a generalized solution for all of the responsibility areas of customer sales and service 120, execution and operation 122, and analytics 124. It is noted that each specific responsibility area is discussed in further detail below.

The model 130 includes numerous business objects and relationships therebetween. The bank object 132 represents an entity performing the banking operations. The party object 134 represents the parties with whom the bank conducts business or other banking relations. The agreement object 136 represents an agreement or a contract with two involved parties, both having agreed to the terms and conditions, including different types of agreement, e.g. written, verbal, implied, etc. The need object 138 describes things that people or customers must have, such as for example customer requests or benchmarks for customer success or performance.

The goal object 140 is a desired state of affairs of the bank, such as financial goals of the bank. The business events 142 can be classified into two categories, operational events and analytical events. Operational events can originate from operational systems, produced during business activities or whenever there is a change in the business environment relevant to the analytical world or created during online transaction at the same time as data is keyed into the banking system. Analytical events can be time-related, possibly triggering a re-evaluation process.

The business rules 144 describe the specific working instructions of the bank including how the act on business events. The operator 146 is an object representing a person or entity acting on behalf of the bank or customer during sales or execution. The object field 148 describes objects belonging to a party or that are a part of an underlying agreement between the party 134 and the bank 132. The object 148 may refer to the assets which are financed by the agreement, such as a mortgage loan, or the asserts which are the foundation for a collateral agreement. The result object 150 can be information generated for a business object, such as an agreement or business event, based on available business information relevant in the context of the bank's goal. The product object 152 can describe the banks' standardized offering to customers, including the associated rights and liabilities.

The meta model 130 illustrates the interrelation between the various meta objects. Additionally, the model includes the restrictions that there is no link between party 134 and product 152, but rather the link always goes via the agreement 136 and that agreements without a related product are possible, for example that there can be a pure money transfer order.

Figure 5:
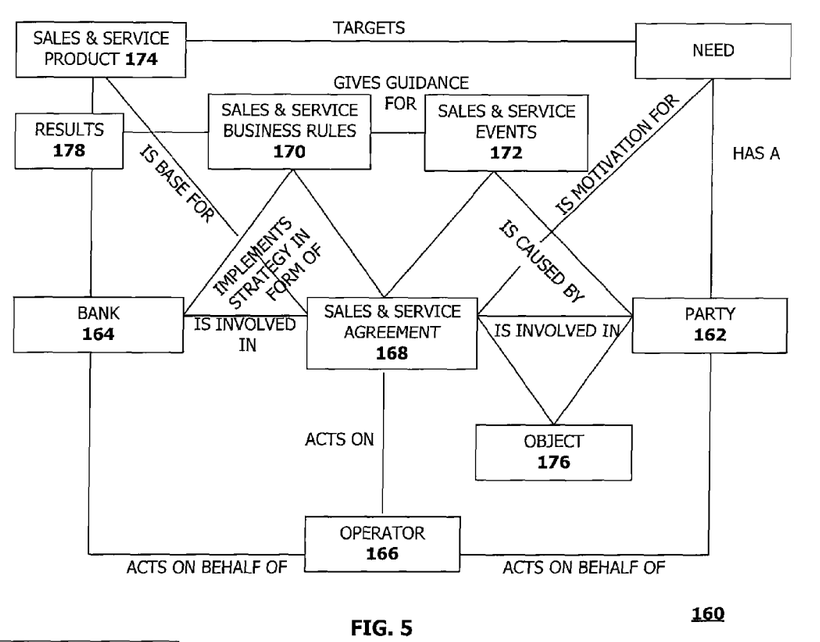
FIG. 5 illustrates a graphical representation of one embodiment of the areas of responsibility as it relates to customer sales and service.

FIG. 5 illustrates a model 160 of the customer sales and service responsibility area. In this area, the major responsibilities include communication and collaboration with customers (Party), acquisition of new customers, generate new businesses and to serve customer requests. To fulfill the responsibility the business logic in an underlying banking software application should: personalize processes, events and information-needs; interact realtime proactive across processing channels; process customer inquiries including breaks and restarts without recapturing of data; offer tailored products to the customer including individualized pricing; and generate new and customer tailored sales products flexible and time to market.

The processes in this area are responsible for market and customer contact activities. These processes include, among others: acquisition of new customers including campaigns and events/originate new agreements; financial advices; serve customer inquiries and orders; customer retention/loyalty programs; personalization of customer contact and interactive usage of information; definition and launch of sales products; and delegation of orders and agreements to Execution & Operations Illustrated in FIG. 5, The model 160 includes designated business objects. The party objects 162 may be customers and/or legal entities entering into different types of banking contracts. The bank objects 164 may be the bank in the banking contracts. The operator object 166 includes a customer side and a bank side. On the customer side, these operators are involved in doing contract origination. On the bank side, these operators are involved in doing contract origination, acting on behalf of the bank.

The sales and services agreements 168 can be the real, legally relevant signed or otherwise consented agreements. The Sales & Service Business rules 170 describe the way bank operators are allowed to engage, such as: authorization guidelines and tolerances. Sales & Service Event 172 is a change in the properties of the party (e.g. bankruptcy, death, marriage, financial conditions) or the sales agreement (e.g. due date of offer, missing document).

Sales & Service Product 174 is anything that can be offered to a party that might satisfy a need. However it is much more than just the agreement and the exchange of financial flows. It is the complete bundle of benefits or satisfactions that buyers perceive they will obtain if they purchase the product. The objects 176 belong to a party and play a role in the sales agreement, which may refer to the assets which are financed by the sales agreement (mortgage loan) or the assets which are the foundation for a collateral agreement. Results 178 are information available for decision support, such as pricing results, information on customer profitability, customer segmentation, where this information may be provided in the analytics area.

The model 160 of FIG. 5 includes designated relationships between the objects, as indicated by corresponding relational text. These designated relationships define the framework of the model itself. For example, in a modeling scenario, the operator 166 may act on behalf of a bank 164 that is involved in a sales and service agreement 168. A sales and service product 174 may target a particular need, which is a motivation for a sales and service agreement 168 or the product 174 may be the basis for an agreement 168. In another example, the bank 164 may implement a strategy in the form of a business rule 170 or a sales and service event 172 may be caused by a party 162 that is involved in the agreement 168. The model 160 illustrates various representative defined relationships in the customer sales and service area of responsibility.

Figure 6:
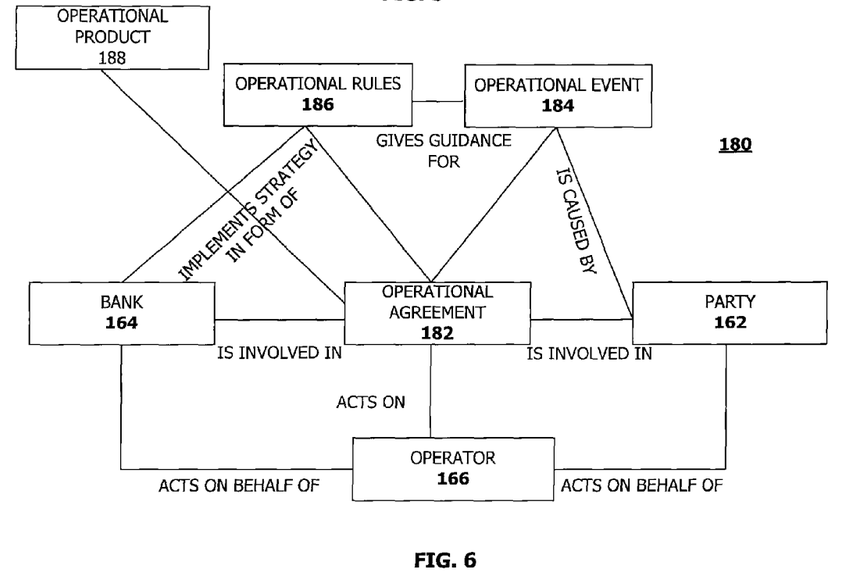
FIG. 6 illustrates a graphical representation of one embodiment of the areas of responsibility as it relates to execution and operations.

FIG. 6 illustrates a model framework 180 for the execution and operations area of responsibility. Responsibility of execution and operation includes execution and/or collaboration fulfillment for financial contract obligations. Responsibilities in this area are to execute and monitor agreements, orders and transactions, automate processes, and handle exceptions. Key business requirements include: automated process and handle exceptions; flexible execution for new agreements; low 'transaction' costs; scale for high volume business—performance; and product line independence allowing e.g. easy bundling of products.

Within this area of responsibility, processes relate to events over a full lifecycle scope. The processes include, among other things: capture and authorize in- and outgoing financial transactions; monitor due dates and initiate expected business events on the agreements; define execution products; settlement of execution agreements; manage and distribute bundles of agreements; and delegate customer contacts to customer sales and service.

The framework 180 for the execution and operation area of responsibility include some of the same or similar objects from the previous framework 160, including party 162, bank 164, and operator 166. Additionally, in this framework 180, the operation agreement 182 may be information relevant to execute a specific loan or other operation, and these objects may differ per different execution engines for different banking operations.

The operation events 184 may originate from either operational systems, produced during business activities, whenever there is a change in the business environment relevant to the analytical world, or are created during online transactions at the same time as data is keyed directly into the system. Operational events 184 can accommodate actual or future events and can refer to actual or future changes. These events 184 are data-driven such that there are no operational events without data.

Operational rules 186 may be rules describing the way the bank operator is allowed to execute various transactions, for example authorization guidelines for a particular lending transaction. The operational product 188 is also illustrated in the framework 180, but in a detached manner indicating that the execution and operation responsibility area concentrates on the processing of financial instruments and knowledge of the particular product or asset 188 and the framework 180 does not necessarily include information as the product or asset itself.

As illustrated in FIG. 6, the framework 180 includes corresponding relationships between the objects. For example, the bank 164 implements a strategy in the form of operational rules 186 that give guidance for an operational event 184. An operational event 184 may be caused by a party 162 that is involved in an operational agreement 182. The model 180 illustrates various representative defined relationships in the customer sales and service area of responsibility.

Figure 7:
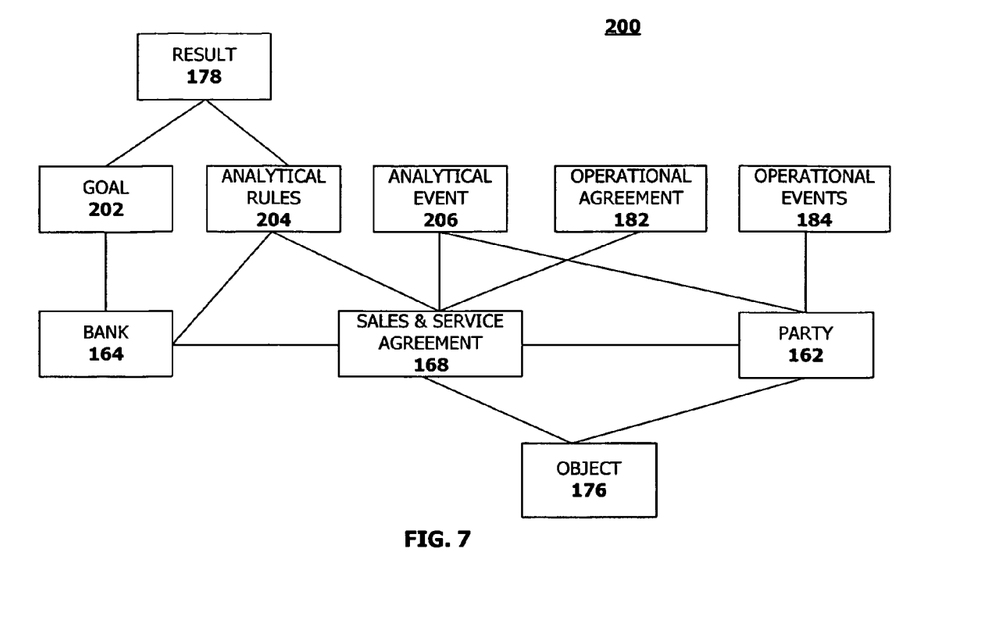
FIG. 7 illustrates a graphical representation of one embodiment of the areas of responsibility as it relates to analytics.

FIG. 7 illustrates a framework 200 for the analytics area of responsibility. This area includes the calculation and valuation of events and/or contracts based on the execution and operation, as described above. The analytics area includes key business requirements of providing different types of information. The providing of this information may include taking the specifics of financial products into account, providing information based on a consolidated information base for all customer service and sales as well as execution and operation business objects. The information may be taken on a fine granularity and on an aggregated level. The information should also be easy to adapt to changing information needs, such as new products and/or new regulations. Additionally, the information should be for decision support (fast) as well as for reporting (comprehensive) and on a consistent basis across analytical engines, products, locations.

Analytics may include various types of processes. For example, a financial product valuation, for value chain related processes, may include calculation/valuation based on business events, which may further take into account legal and business concerns. The financial product valuation may also be based on business date, such as for appreciation or depreciation calculations. Operational valuation processes may provide business support. Enterprise wide reporting and strategic management operations may provide various levels of analysis, including areas such as financial reporting, regulatory reporting, balance scorecard calculations, among others. Decision support processes are also available, such as calculations, valuations and/or result based on business requests or typical processes such as pricing operations during contract origination, customer overview, online availability check regarding risk limits and pre-deal simulation for portfolio management, among others. Analytics may also include customer behaviour analysis and customer investment performance operations.

The framework 200 for the execution and operation area of responsibility includes some of the same or similar objects from the previous framework 160, including bank 164, sales and service agreement 168, party 162, object 172, result 178, operational agreements 182 and operational events 184. The framework 200 also includes the objects goals 202, analytical rules 204 and analytical events 206.

The framework 200 also includes the objects goals 202, analytical rules 204 and analytical events 206. The goal object 202 may be the desired state of affairs of the bank, which may include profit motive and/or regulatory goals. The analytical rule object 204 may include valuation and calculation rules. For instance, contract valuation rules by dependent on different jurisdictions or accounting principles. The analytical events 206 are time-related events having a semantic and trigger re-evaluation processes. In these events, results may differ from previous analysis based on different factors, including a change in master data, change in market data, changed or new relationships or a change in time factors.

Figure 8:
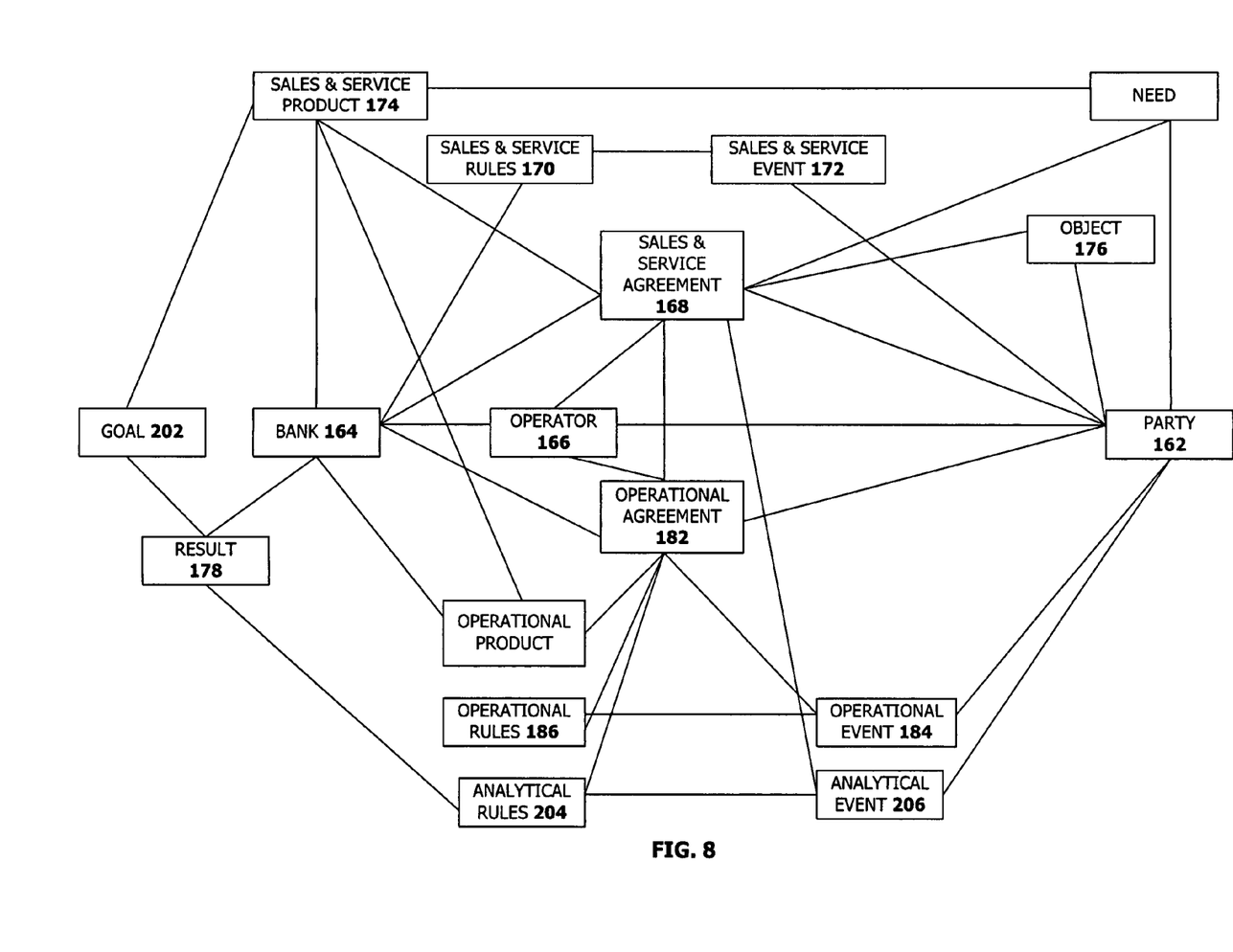
FIG. 8 illustrates one embodiment of an aggregate model of the areas of responsibility.

In one embodiment of a model framework, FIG. 8 illustrates an inter-object relationship between various objects aggregated across all three designated areas of responsibility. The framework includes the objects illustrated and discussed in the models 160, 180 and 200 above, with respect to FIGS. 5-7. The framework also shows one embodiment of the related interdependency therebetween.

Figure 9:
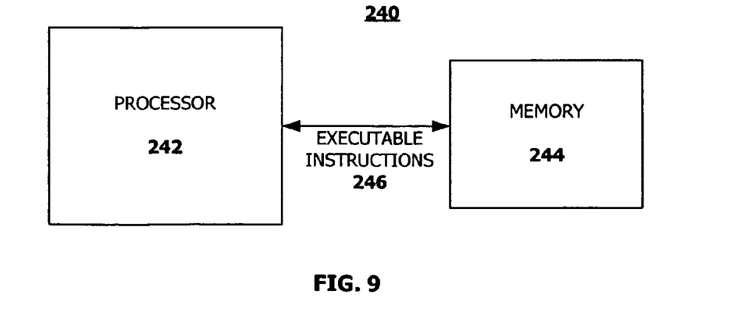
FIG. 9 illustrates a block diagram of a processing environment.

FIG. 9 illustrates an apparatus 240 including a processing device 242, a memory 244 and executable instructions 246. The processing device may be one or more processing elements operative to perform various operations in response to the executable instructions 246. The memory device 244 may be one or more storage devices operative to store and thereupon provide the executable instructions 246 to the processing device 242. The apparatus 240, processing device 242 and memory 244 may be disposed on a single computing system or disposed across one or more systems in a networked processing environment.

Figure 10:
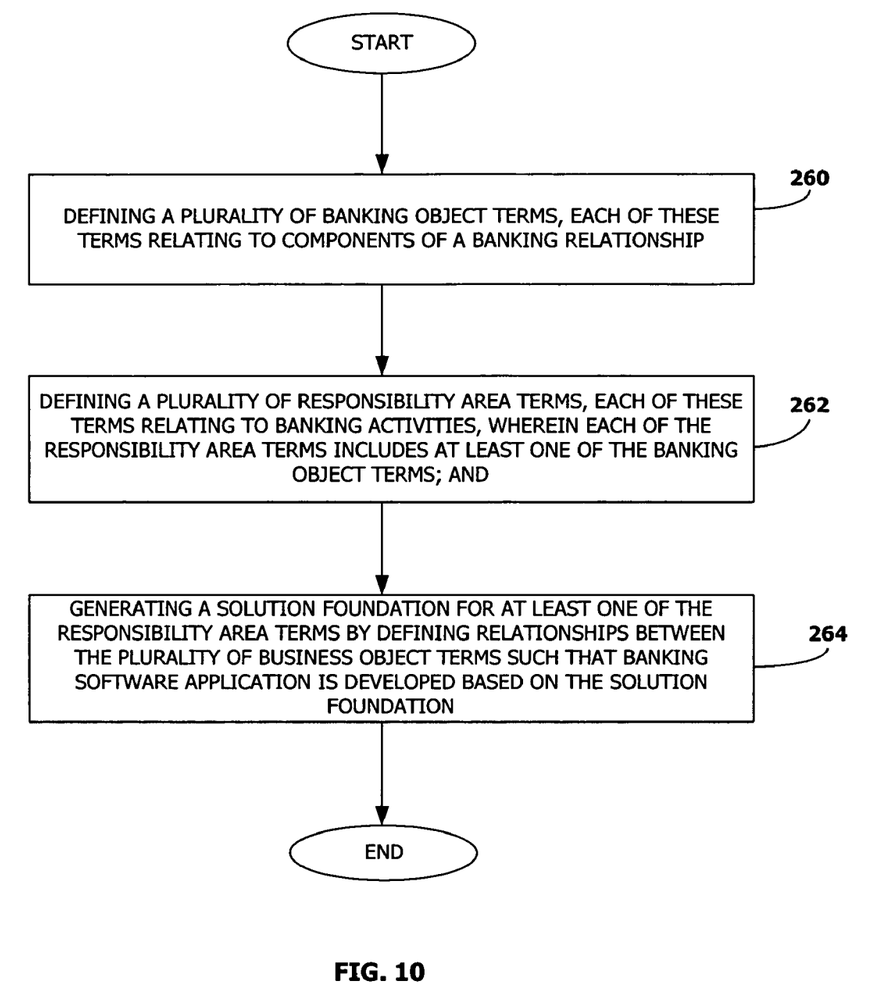
FIG. 10 illustrates the steps of one embodiment of a method for developing a banking software application.

FIG. 10 illustrates the steps of one embodiment of a method for banking software application development. These steps may be performed on a processing device, such as the device 242 of FIG. 9. In one embodiment, the method begins, step 260, by defining a plurality of banking object terms, each of these terms relating to components of a banking relationship. As discussed above, the banking object term may be the banking objects illustrated in the models of FIGS. 5-8, where each of the objects described above relate to one or more components of a banking relationship.

In one embodiment, the next step, step 262, is defining a plurality of responsibility area terms, each of these terms relating to banking activities, wherein each of the responsibility area terms includes at least one of the banking object terms. For example, as described above there are four layers of responsibility, including the banking business object, as illustrated in FIG. 1. This layer includes the responsibility areas of customer service and sales 120, execution and operations 122 and analytics 124. Each of these areas includes numerous banking object terms, as illustrated in FIGS. 5-7.

In one embodiment, the next step, step 264, is generating a solution foundation for at least one of the responsibility area terms by defining relationships between the plurality of business object terms such that banking software application is developed based on the solution foundation. By way of example, FIG. 5 illustrates one embodiment of the various defined relationships between the plurality of business object terms. These interdependent relationships generate a framework upon which subsequent banking business applications may be developed. Thereupon, in this embodiment, the method is complete.

Although, the above-described method may include additional steps in alternative embodiments. For example, an additional step may include generating solution foundations for each of the responsibility area terms by defining relationships of the business objects terms and generating an aggregate relationship definition across the responsibility area terms. For example, a solution foundation may include the aggregate relationships illustrated in FIG. 5, 6 or 7, where these are across corresponding responsibility area terms. In another embodiment, the method may include generating the solution foundation based on the aggregate definition relationship.

In another embodiment, the step of generating the solution foundation may include modeling the relationships to generate the solution foundation and the step of assembling the banking software application includes generating a runtime implementation of the modeled relationships. This embodiment may include performing the modeling operations in accordance with known modeling techniques using the newly developed framework described above. In the generation of the runtime implementation, this includes codifying the components of the framework such that the generated application performs as determined by the relationships.

Figure 11:
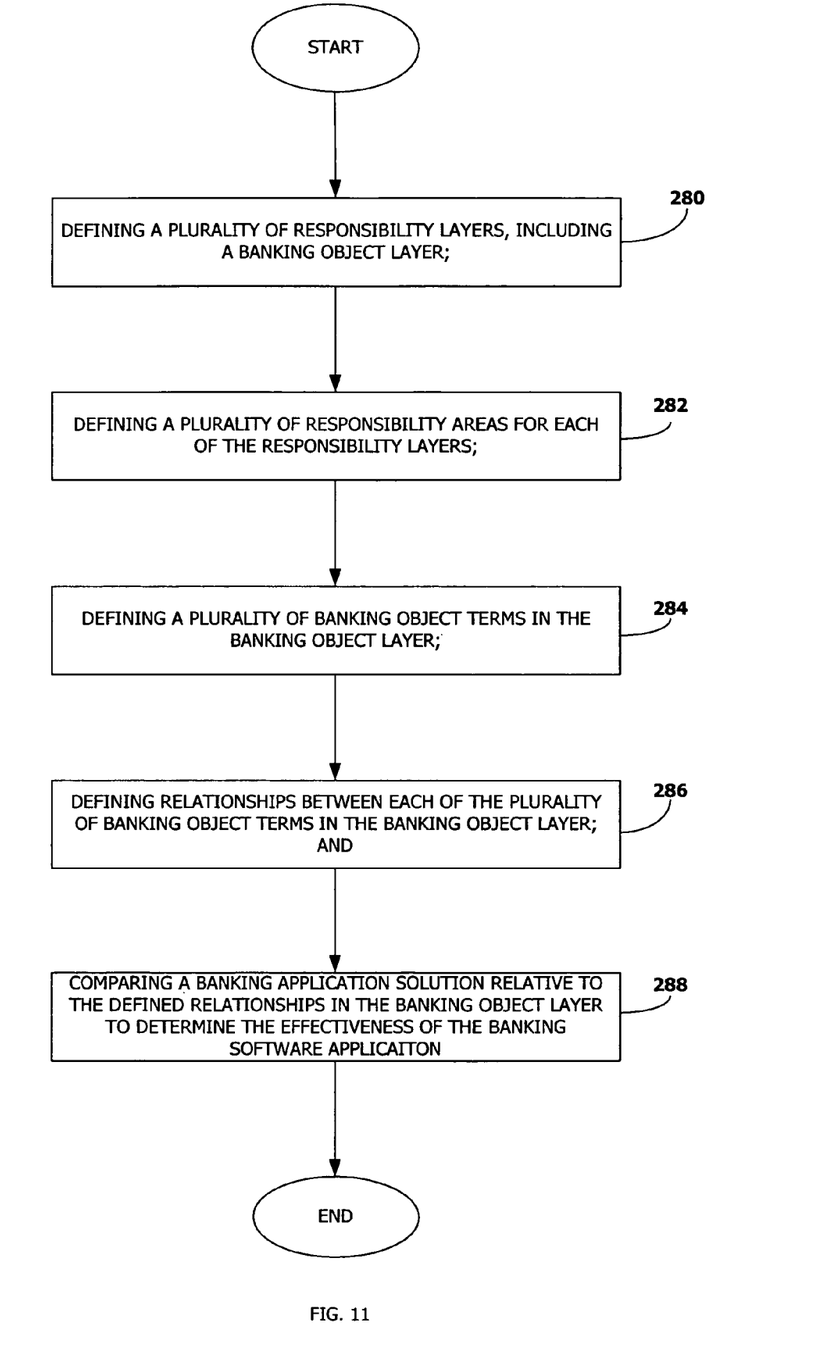
FIG. 11 illustrates the steps of one embodiment of a method for generating backing software application guidelines.

FIG. 11 illustrates a flowchart of the steps of one embodiment of a method for generating banking software application guidelines, where the guidelines are used to generate a banking software application. In one embodiment, the method begins, step 280, by defining a plurality of responsibility layers, including a banking object layer. The next step, step 282, is defining a plurality of responsibility areas for each of the responsibility layers. For example, FIG. 1 illustrates four different responsibility layers and FIG. 2 illustrates 3 areas of responsibility of one of the layers.

The next step, step 284, is defining a plurality of banking object terms in the banking object layer, such as the objects illustrated in FIGS. 5-8 and discussed above. Thereupon, the method further includes, step 286, defining relationships between each of the plurality banking object terms in the banking object layer. In this embodiment, the final step, step 288, is then comparing a banking application solution relative to the defined relationships in the banking object layer to determine the effectiveness of the banking software application. This step may include testing the application through various operation scenarios. By way of example, FIG. 5 illustrates the defined relationship between different objects, processing scenarios may perform steps or functions in accordance with banking software application and the generated solution is then comparable to an expected result. This then provides a secondary approach to analysis of a banking software application using the object framework described above.

Through the modeling framework, a banking business application may be properly and more efficiently developed. The definition of the business object terms and defined relationships builds the model framework. This framework incorporates various areas of responsibility in the banking environment. The modeling allows for defined relationships between objects in different responsibilities areas, thus allowing a greater degree of granularity in application design. Additionally, the definition of business objects and the relationships therebetween adds a level of flexibility to allow the framework to be easily adjusted to changes in the banking environment. Improved banking software applications are therein development through this framework.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A method for developing a banking software application, the method comprising:
    creating, using a processing device, a banking business object layer representing a layer of software objects;
    in the banking business object layer, creating, using the processing device, a plurality of tasks to be performed, each task corresponding to a respective responsibility area that represents a respective set of banking activities;
    creating, using the processing device, a plurality of banking objects each representing an entity that performs certain banking operations;
    creating, by the processing device, a first solution template for a first task of the plurality of tasks, the first solution template including a first set of business objects and defining relationships between objects of the first set of business objects;
    creating, by the processing device, a second solution template for a second task of the plurality of tasks, the second solution template including a second set of business objects and defining relationships between objects of the second set of business objects, wherein the first set of business objects and the second set of business objects are among the plurality of banking objects and share at least one common business object;
    generating, by the processing device, a first runtime executable based on the first solution template and a second runtime executable based on the second solution template; and
    assembling, by the processing device, the banking software application from the generated first and second runtime executables.

2. The method of claim 1, further comprising:
    generating a solution template for a third task by defining relationships between a third set of business objects; and
    generating an aggregate relationship definition across the first, second and third tasks.

3. The method of claim 2, further comprising:
    generating a solution template based on the aggregate definition relationship.

4. The method of claim 1, further comprising:
    defining a plurality of responsibility layers that relate to different responsibility levels of the banking software application in addition to the banking business object layer.

5. The method of claim 4, wherein the responsibility layers include an infrastructure layer, a process layer and a user interface layer.

6. The method of claim 5, wherein the responsibility layers are independent from each other and are accessible through at least one independent interface.

7. The method of claim 1, wherein the first, second and third tasks correspond to responsibility areas that include a customer sales and service area, an execution and operations area and an analytics area.

8. An apparatus for generating a software development model for a banking software application, the apparatus comprising:
    a memory device having executable instructions stored therein; and
    a processor in operable communication with the memory device and operative to:
        create a banking business object layer representing a layer of software objects;
        in the banking business object layer, create a plurality of tasks to be performed, each task corresponding to a respective responsibility area that represents a respective set of banking activities;
        create a plurality of banking objects each representing an entity that performs certain banking operations;
        create a first solution template for a first task of the plurality of tasks, the first solution template including a first set of business objects and defining relationships between objects of the first set of business objects;
        create a second solution template for a second task of the plurality of tasks, the second solution template including a second set of business objects and defining relationships between objects of the second set of business objects, wherein the first set of business objects and the second set of business objects are among the plurality of banking objects and share at least one common business object;
        generate a first runtime executable based on the first solution template and a second runtime executable based on the second solution template; and
        assemble the banking software application from the generated first and second runtime executables.

9. The apparatus of claim 8, the processing device, in response to the executable instructions, is further operative to:
    generate a solution template for a third task by defining relationships between a third set of business objects; and
    generate an aggregate relationship definition across the first, second and third tasks.

10. The apparatus of claim 9, the processing device, in response to the executable instructions, is further operative to:
    generate a solution template based on the aggregate definition relationship.

11. The apparatus of claim 8, the processing device, in response to the executable instructions, is further operative to:
    define a plurality of responsibility layers that relate to different responsibility levels of the banking software application in addition to the banking business object layer.

12. The apparatus of claim 11, wherein the responsibility layers include an infrastructure layer, a process layer and a user interface layer.

13. The apparatus of claim 12, wherein the layers are independent from each other and are accessible through at least one independent interface.

14. The apparatus of claim 8, wherein the first, second and third tasks correspond to responsibility areas that include a customer sales and service area, an execution and operations area and an analytics area.

15. A method for generating banking software application guidelines using a computer, where the guidelines are used to generate a banking software application, the method comprising:
- defining a plurality of responsibility layers that include a banking business object layer;
- defining a plurality of responsibility areas for the banking business object layer, each of the responsibility area corresponding to a respective set of banking activities;
- for each of the plurality of responsibility areas:
  - creating, using the computer, a meta-model including a plurality of banking object terms, each of these terms relating to components of a banking relationship, and a plurality of relationships between the banking object terms;
  - generating, using the computer, a solution template by modeling relationships between the respective plurality of banking object terms, the modeled relationships further defining the plurality of relationships of the meta-model;
- generating a runtime executable of the modeled relationships using the computer;
- assembling a banking software application from the generated runtime executables of the modeled relationships using the computer; and
- comparing a banking application solution relative to the defined relationships in the banking object layer to determine the effectiveness of the assembled banking software application.

16. The method of claim 15, further comprising:
- generating an aggregate model defining relationships across the responsibility areas; and
- generating a solution template based on the aggregate model.

* * * * *